(12) United States Patent
Greiner et al.

(10) Patent No.: US 6,216,208 B1
(45) Date of Patent: Apr. 10, 2001

(54) PREFETCH QUEUE RESPONSIVE TO READ REQUEST SEQUENCES

(75) Inventors: Robert Greiner, Beaverton; David L. Hill, Cornelius; Chinna Prudvi, Portland; Derek T. Bachand, Portland; Matthew A. Fisch, Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/999,241

(22) Filed: Dec. 29, 1997

(51) Int. Cl.[7] ................................................. G05F 12/08
(52) U.S. Cl. ................................. 711/137; 711/213
(58) Field of Search .................................. 711/118, 137, 711/213, 217, 218, 219, 220

(56) References Cited

U.S. PATENT DOCUMENTS 5,537,573 * 7/1996 Ware et al. ............................ 711/137
5,586,294 * 12/1996 Goodwin et al. ..................... 711/137
5,701,426 * 12/1997 Ryan ........................................ 711/3
5,740,399 * 4/1998 Mayfield et al. ..................... 711/137
5,761,706 * 6/1998 Kessler et al. ........................ 711/118

OTHER PUBLICATIONS

Palacharla et al., "Evaluating Stream Buffers as a Secondary Cache Replacement", 1994, IEEE, P 24–33.*
Jouppi et al., "Tradeoffs in two–Level On–Chip Caching", 1994, IEEE, P 34–45.*

* cited by examiner

Primary Examiner—Kevin L. Ellis
(74) Attorney, Agent, or Firm—Kenyon & Kenyon

(57) ABSTRACT

A prefetching control system provided for a processor. The prefetching queue may include an arbiter, a cache queue and a prefetch queue. The arbiter issues requests including read requests. Responsive to a read request, the cache queue issues a control signal. The prefetch queue receives the control signal and an address associated with the read request. When the received address is a member of a pattern of read requests from sequential memory locations, the prefetch queue issues a prefetch request to the arbiter.

14 Claims, 3 Drawing Sheets

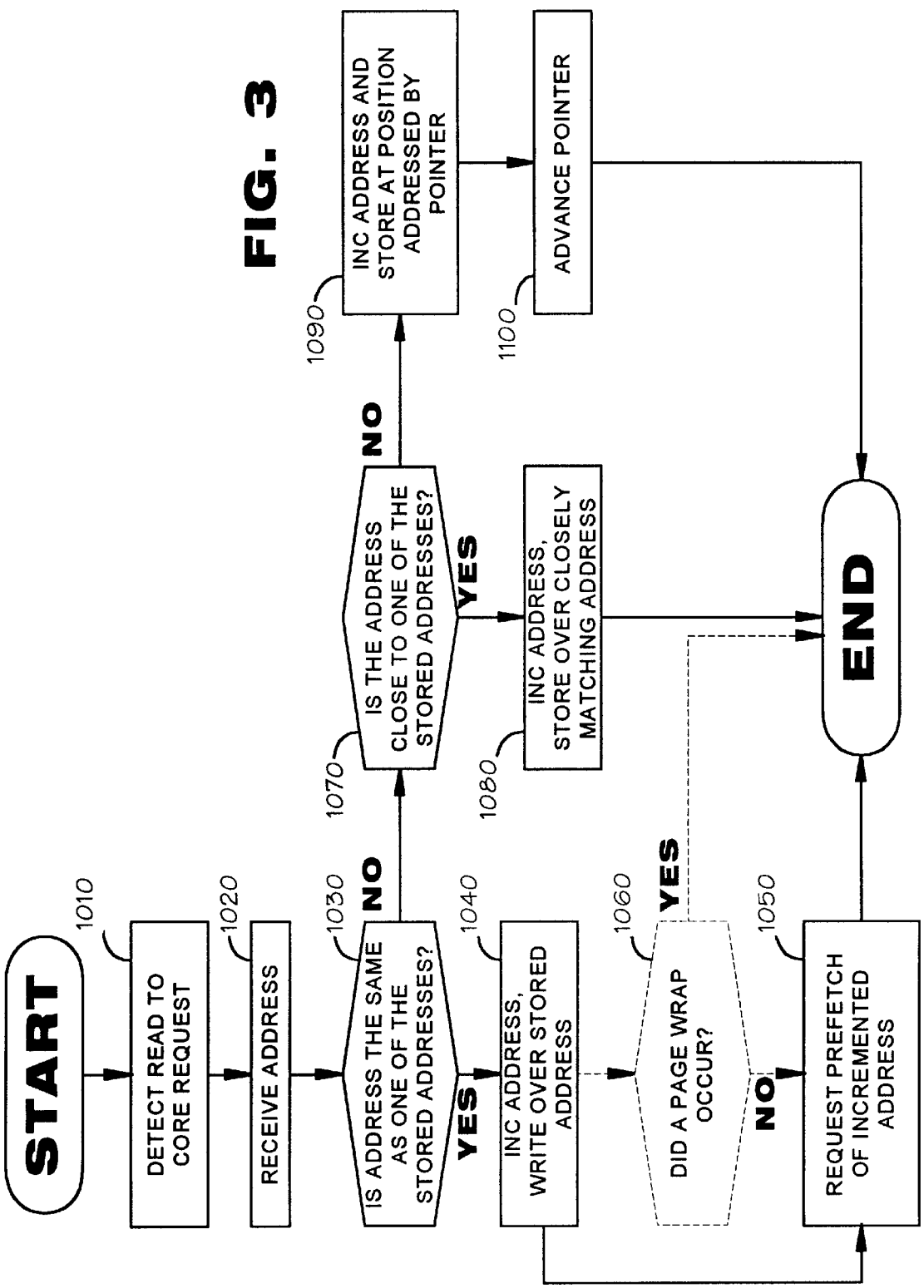

PREFETCH QUEUE RESPONSIVE TO READ REQUEST SEQUENCES

BACKGROUND OF THE INVENTION

The present invention relates to a prefetch queue provided for an external cache memory in a processor.

Prefetching is a known technique implemented in processor devices. Prefetching causes data or instructions to be read into the processor before it is called for by the processor's core execution unit ("core"). By having the data available within the processor when the core is ready for it, the core need not wait for the data to be read from slower external memories. Instead, the data is available to the core at the relatively higher data rates of internal buses within the processor. Because prefetching can free a core from having to wait while data requests are fulfilled, prefetching can improve processor performance.

If implemented incorrectly, however, prefetching can impair processor performance. By reading data from external memories into the processor, prefetch operations occupy resources on the external bus. Also, prefetching generally reads data into a memory cache at the core. Due to the limited size of the core cache, prefetching may write data over other data that the processor uses. Further, prefetching may read data into the processor that may never be used. Thus, prefetching is useful only if it improves processor performance more often than it impairs such performance. Instruction streaming, a type of prefetching, occurs when a core causes data to be read sequentially from several adjacent positions in external memory. Instruction streaming suffers from the above disadvantages.

It is known that prefetching may provide significant performance improvements when a processor either executes instructions or manipulates data held in adjacent memory locations. However, no known prefetching scheme adequately distinguishes programs that perform sequential memory reads from those that perform non-sequential memory reads. Further, some programs may perform sequential reads "in parallel." They may read data from sequential memory positions in a first area of memory interspersed with reads from sequential memory positions in a second area of memory. Traditional prefetching techniques do not recognize multiple streams of sequential memory reads as appropriate for prefetching.

Accordingly, there is a need in the art for a prefetch scheme that prefetches only when there exists a pattern demonstrating that performance improvements are to be obtained by prefetching. There is a need in the art for a prefetch scheme that incurs low performance costs for erroneous prefetches. Further, there is a need in the art for a prefetch scheme that detects and observes parallel prefetch operations.

SUMMARY OF THE INVENTION

The disadvantages of the prior art are alleviated to a great extent by a prefetching controller provided for a processor. An embodiment of the prefetching controller detects a read request issued by a processor core and receives an address associated with the request. When the received address is a member of a pattern of sequential data reads from memory, the controller prefetches data from the next location in the sequence.

BRIEF DESCRIPTION OF THE DRAWINGS

FIG. 3 is a flow diagram of a method of operation of the prefetch queue in accordance with an embodiment of the present invention.

DETAILED DESCRIPTION

Figure 1:
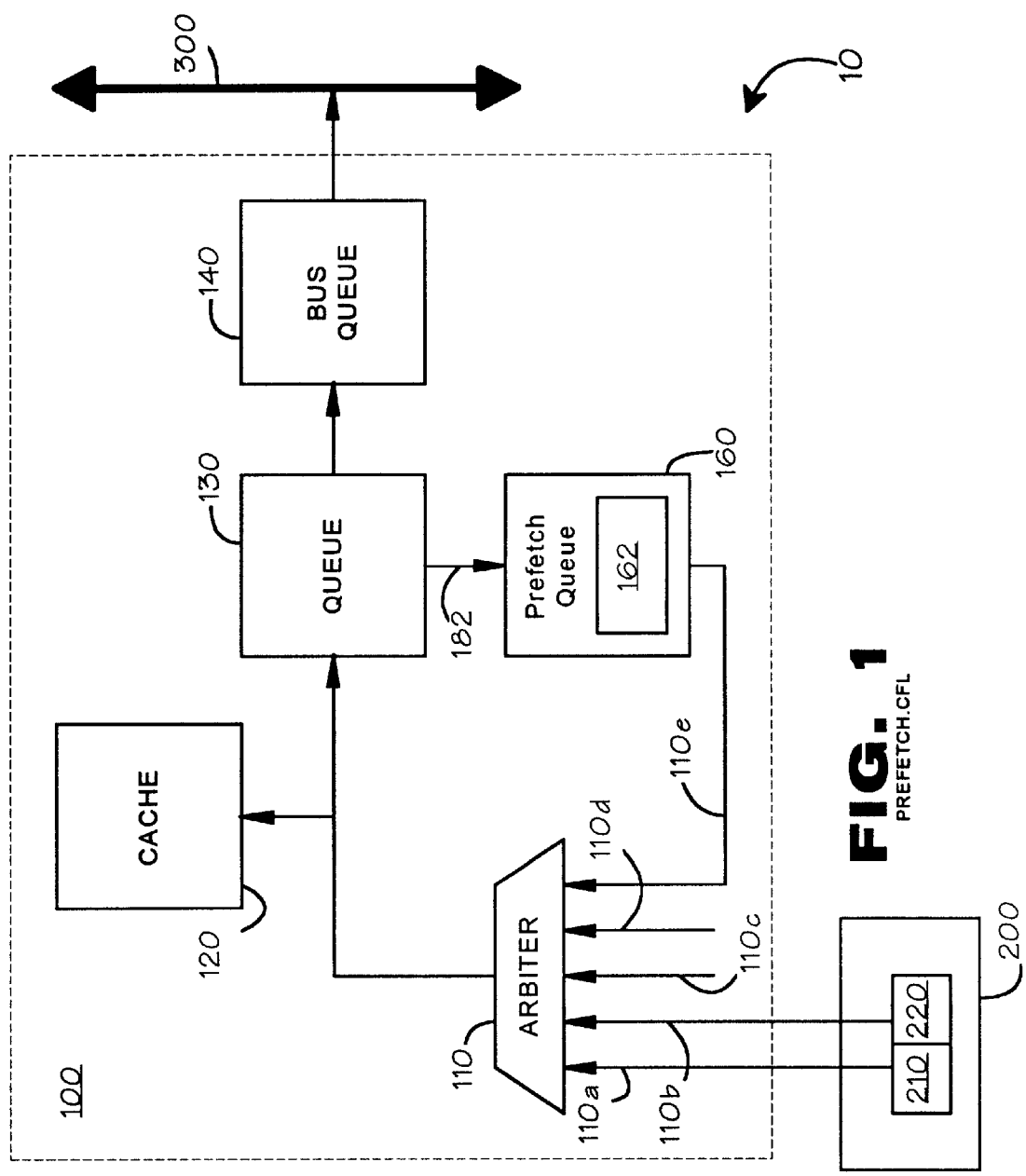
FIG. 1 is block diagram of a processor constructed in accordance with an embodiment of the present invention.

FIG. 1 illustrates an embodiment of a processor 10 constructed in accordance with an embodiment of the present invention. The processor 10 includes a bus sequencing unit 100 ("BSU") and a core 200. Both the BSU 100 and the core 200 operate at much greater speeds than are associated with an external bus 300. The external bus 300 interconnects the processor 10 with other components such as other processors, read only memories, random access memories and other devices (not shown).

BSUs per se are known. They typically include an arbiter 110, a cache memory 120, an internal queue 130 and a bus queue 140. The arbiter 110 receives requests from a variety of inputs 110a–e, such as from the core 200 and perhaps from other sources such as from the bus queue 140. Requests typically include a request code representing the type of request being made and, where appropriate, an address identifying data on which the request is to be performed. The arbiter 110 prioritizes the requests and implements them in the order of priority.

The cache 120 is an internal memory. As is known, relative to core cache memories, the cache 120 typically possesses much greater capacity. For example, a typical cache 120 may be a 128k memory. By contrast a core data cache 210 may be a 32k memory and a core instruction cache may be an 8k memory. Typically, the cache 120 may be a unified cache, one that stores both instruction data and variable data (collectively, "data").

The internal queue 130 includes control circuitry and buffer memory to process requests from the arbiter 110. Each request issued by the arbiter 110 is forwarded to the internal queue 130 and placed in queue. The internal queue 130 determines whether the request may be executed within the BSU 100 or whether the BSU 100 must refer the request to the external bus 300 for completion. If the internal queue 130 determines to refer the request to the external bus 300, the internal queue 130 forwards the request to the bus queue 140. The bus queue 140 also includes control circuitry and buffer memory. It manages transactions on the external bus 300 to process requests issued from within the processor 10.

If the internal queue 130 determines that the BSU 100 may fulfill the request internally, the internal queue 130 executes the request. For example, if the request requires a read of data to the core 200 and the requested data is held in the cache 120, the internal queue 130 causes the data to be read to the core 200.

The internal queue 130 monitors data held by the cache 120. Thus, when the arbiter 110 issues a request to read data from an external memory location, the internal queue 130 may determine whether a copy of the requested location is held in the cache 120.

An embodiment of the present invention provides a prefetch queue 160 in communication with the internal queue 130. The internal queue 130 monitors the requests issued by the arbiter 110 and informs the prefetch queue 160 of read requests. The read requests may be requests for either instruction data or variable data to be read to the core 200. The read requests identify a memory address from which data is to be read. The addresses are subject to address translation so that, when received by the internal queue 130, they represent physical addresses in external memory. Over time, read requests may exhibit a pattern indicating that the processor core 200 is reading from sequential locations in external memory. When this pattern arises, the prefetch queue 160 prefetches from the next location in the sequence. It submits an address to the arbiter 110 over data line 110e. The arbiter 110 is provided with circuitry (not shown) that interprets the address as a prefetch request and generates a request code representing an instruction for a read of data to the cache 120.

Figure 2:
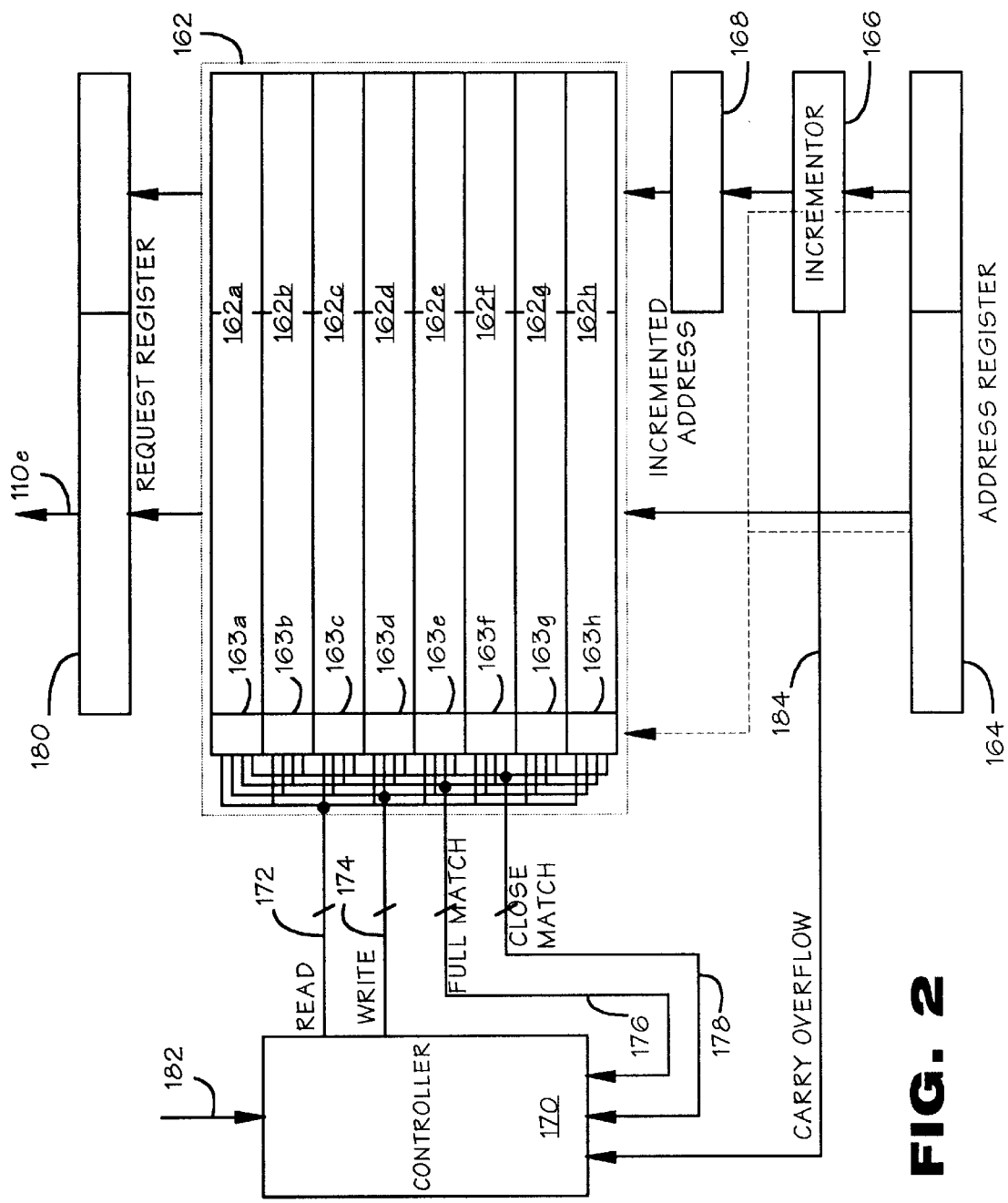
FIG. 2 is a block diagram of a prefetch queue in accordance with an embodiment of the present invention.

FIG. 2 illustrates an embodiment of a prefetch queue 160. An address register 164 stores addresses associated with read requests. The address register 164 shown may be provided in the prefetch queue 160 or, alternatively, may be provided in the internal queue 130. For example, when the address register 164 serves other functions in addition to its role in the prefetch queue 160, the internal queue 130 may be a preferred location for the address register 164 because its output may propagate to other components of the BSU 100 including, for example, to the bus queue 140 and within the internal queue 130.

An incrementor 166 receives the least significant bits of the address stored in the address register 164 and outputs the incremented address bits to an incremented address register 168. The incrementor 166 also outputs a carry bit that may be delivered to a controller 170 described below.

The prefetch queue 160 includes an address buffer 162, populated by individual entry buffers 162a–h. The entry buffers store addresses associated with previous read requests. Data may be written to a buffer entry such as 162a from two locations: The most significant bits are written from the address register 164, the least significant bits are written from the incremented address register 168. Thus, when an address of a first read request is input to the address register 164, the address is incremented and stored in a buffer entry such as 162a. When a second read request is made to an adjacent address and stored in the address register 164, the incremented address stored in buffer entry 162a will match the address of the second read request, the address stored in address register 164.

Each entry is associated with match detection circuitry 163–h that determines whether any of the addresses stored in the address buffer 162 match the address in the address register 164. The match detection circuitry 163a–h detects two types of matches: A full match where the addresses are a perfect match, and a close match where the addresses match within a predetermined margin of error. If a full match is detected, the match detection circuitry 163a–h strobes one of plurality of full match signal lines 176 identifying the matching buffer entry 162a–h. If a close match is detected, the match detection circuitry 163a–h strobes one of a plurality of close match signal lines 178 identifying the closely matching buffer entry 162a–h.

A controller 170 manages operation of the prefetch queue 160. The controller 170 controls reading and writing of data to the address buffer 162 via parallel read and write lines 172, 174. A separate read line 172 and write line 174 may be provided for each entry buffer in the address buffer 162. Activation of the write line 174 causes data to be written to the corresponding entry buffer. Activation of the read line 172 causes data to be read from the corresponding buffer entry of the address buffer 162 to a request register 180. The controller 170 senses full address matches and close address matches from the match detection circuitry 163a–h over the parallel sensory lines 176, 178. The controller 170 also reads carry overflow information from the incrementor 166.

A request register 180 stores an address to be included in a prefetch request. An address is read from one of the buffer entries 162a–h to the request register when the controller 170 activates one of the read lines 172. The request register 180 outputs the address to line 110e which is input to the arbiter 110 of FIG. 1.

When the internal queue 130 encounters a read request, it strobes the controller 170 over a control line 182. The controller 170 polls the full match and close match signals 176, 178 to determine whether the match detection circuitry 163a–h registered a match of any kind. When a full or close match occurred, the controller 170 causes an incremented address to be written to the matching buffer entry, say 162a. The most significant bits are written from address register 164 and the least significant bits are written from the incremented address register 168. If the match is a close match, the controller 170 no further action is taken with respect to the read request.

If the controller 170 senses a full match, the controller 170 optionally may poll the carry flag 184 from the incrementor 166 to determine whether a carry overflow occurred. A carry overflow may represent a "page wrap," described below. If no overflow is detected, the controller 170 reads the incremented address from the buffer entry 162a to the request register 180, causing a prefetch request to be made. If an overflow is detected, the controller 170 may abort the prefetch.

By convention, processor devices such as a personal computer allocate external memory as pages of data in, for example, 4k blocks. Data from different pages may be allocated for different applications. For example, a first 4k page may be allocated for a memory matrix, a second 4k page may be allocated for video memory and a third 4k page may be allocated for executable instructions. In this example, an address from one 4k page should not be considered a "close match" to an address from another 4k page. Differences among the data types makes it unlikely that the core will read data sequentially across pages. Thus, when incrementing an address causes the incremented address to "wrap" to the next page, it is appropriate to treat a full match as a close match rather than to begin a prefetch.

In an embodiment where data is organized into pages, the prefetch queue 160 considers only the most significant bits of addresses to determine whether a close match occurs. For 4k pages, the least significant twelve bits of an address reference locations of a single page. The remaining most significant bits of the address identify the page itself Thus, if the most significant bits of an address in the buffer entries 162a–h match the most significant bits of the address in the address register 164, it is considered a close match.

Other embodiments may not organize memory into pages of data. There, it may be appropriate to consider any two addresses that are within a predetermined number of addresses of each other as a close match. In this embodiment, the close match simply detects whether the core 200 has skipped addresses only to resume sequential reading at a later point.

In an embodiment of the invention, the prefetch queue 160 operates according to the method of FIG. 3. The prefetch queue 160 receives notice of a read request from the internal queue 130 (Step 1010). The prefetch queue 160 reads in the address provided with the read request (Step 1020) and determines whether the address matches a previously stored incremented address (Step 1030). If so, the prefetch queue 160 increments the address and writes it over the previously stored address (Step 1040). The prefetch queue 160 requests a prefetch of data at the incremented address (Step 1050). Optionally, before step 1050, the prefetch queue 160 determines whether a page wrap occurred (Step 1060). If no page wrap occurred, the prefetch queue 160 advances to step 1050; otherwise the prefetch queue 160 terminates the method.

If, at step 1030, the address did not match any previously stored address, the queue 160 determines whether the address is a close match to one of the stored addresses (Step 1070). When the close match occurs, the prefetch queue 160 increments the received address and writes it over the closely matching address (Step 1080). It does not trigger a prefetch read operation.

If the received address is not a close match to any stored address, the prefetch queue 160 increments the received address and writes it at a buffer entry pointed to by a pointer (not shown) (Step 1090). The prefetch queue 160 then advances the pointer to the next buffer entry (Step 1100). If the pointer was positioned at the last available buffer entry, it wraps up to the first buffer entry. Thus, the pointer steps through the buffer entries 162a–h in a first in, first out order. Alternatively, the pointer may step through the buffer entries according to a round-robin or least recently used pattern.

Where external memory is allocated as pages of a predetermined length (such as the 4k pages described above), the incrementing steps described above are confined to the pages in which an address originated. If an address from a read request references the bottom of a first page and is incremented, the result is not permitted to reference the top of the next adjacent page (called a "page overflow"). Instead, it wraps around to the top of the first page. For example, using the 4k page example, incrementing an address 3012FFFF [HEX] normally would result in 3013000 [HEX]. Instead, it results in 30120000 [HEX]. The carry from the twelve least significant bits of the address is not permitted to propagate to the more significant bits.

To facilitate the discussion, consider the case when the processor begins reads from sequential memory locations to the core 200. The internal queue 130 identifies a first read request from the first memory location in the series (say, location A). Triggered by the read request, the prefetch queue 160 checks the stored addresses but detects no match. Accordingly, it increments the address (to A+1), stores the incremented address and advances the pointer.

When the internal queue 130 identifies a read request to the next address in the series (A+1), the prefetch queue 160 detects a match between it and address A+1 as previously stored. The prefetch queue 160 increments the address (to A+2) and writes the incremented address over the matching address. The prefetch queue 160 also requests a prefetch from address A+2. The request causes the arbiter 110 to prefetch data from location A+2.

When the internal queue 130 identifies another read request identifying location A+2, the data from A+2 will have been prefetched into the cache 120. Thus, the data may be delivered to the core 200 without resorting to the slower external bus 300. However, triggered by the read request, the prefetch queue 160 determines that the address matches a stored address. Again, the prefetch queue 160 increments the stored address (this time to A+3), and causes the arbiter 110 to prefetch from location A+3. Thus, when sequential reads occur, the cache 100 remains a step ahead of the processor core 200.

The prefetch queue 160 advantageously monitors several sequential reads that occur in parallel. In the example above, a first sequential read began at memory location A. Another sequential read may begin at memory location B. The sequential reads from location B may occur without interrupting the prefetch queue's 160 ability to monitor sequential reads based on the A series.

Consider an example where, after the read request identifying location A+2, the processor core 200 reads from locations B through B+4 sequentially. When the internal queue 130 identifies the read request identifying location B, the prefetch queue 160 detects no match. It increments the address to B+1 and stores it in a second buffer entry. When the core 200 reads from locations B+1 through B+4, the prefetch queue 160 detects matches and prefetches data accordingly.

If after the core 200 reads from location B+4, the core 200 resumes the sequential read based upon A+3, the prefetch queue 160 detects a match with the previously stored address A+3. Thus, the prefetch queue 160 prefetches data from location A+4. The prefetch queue 160 preferably provides a plural number of buffer entries to follow parallel prefetches.

The prefetch scheme tends not to prefetch data unless a pattern of sequential reads is observed. If the core 200 issues read requests from locations C through Z, none of which are sequential to each other, no prefetching will be performed. The prefetch queue 160 does not detect a match between the address of a read request and an address stored in the address buffer 162. Thus, when sequential reads do not occur, the prefetch scheme of the present invention does not impair processor performance.

The prefetch queue 160 as described above operates to identify and respond to sequential memory reads from external memory in an ascending order of addresses. The prefetch queue may also be configured to identify sequential read patterns from descending address locations. In the prefetch queue above, a decrementor is substituted for the incrementor 166 of FIG. 2. Other operation of the prefetch queue 160 remains the same.

As is described above, the prefetch queue 160 may be triggered by read requests. Read requests include requests for instructions to be executed by the core 200 and requests for data to be used by the core 200 in the course of executing an instruction. Further, read requests include the known "read for ownership" ("RFO") requests. RFO requests occur when a core 200 writes to an external memory location. The core 200 first reads the data into memory. If the processor operates in a multi-agent system, where two or more processors operate on the same external bus, the RFO request causes the processor to read in a way that causes the other agents to determine whether they have cached a more current copy of the data. If so, the other agents update the data before the data is read into the core 200. RFO requests are time-consuming. The prefetch queue 160 achieves an additional benefit by starting the RFO request before the core 200 has called for the data and, thus, reduces core idle time.

The principles of the present invention illustrated with reference to the embodiments described above provides a prefetch scheme for a processor that provides several advantages over the known prefetch techniques:

The prefetch operation occurs only after read requests demonstrate a pattern of prefetching. At the first read request, the prefetch queue does not prefetch. However, when sequential reads occur, the prefetch queue begins prefetching immediately.

The prefetch scheme incurs low costs for erroneous prefetches. The prefetch reads data into the cache 120 rather than the processor core 200. Because the cache 120 typically is much larger than the processor core 200, errors tend not to impact processor performance significantly.

The prefetch scheme detects and monitors several parallel sequential reads.

The prefetch scheme also "locks on" to sequential memory reads very quickly. The processor core 200 reads from the second memory location in a sequence, the prefetch queue 160 is triggered.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A prefetching system for a processor, comprising:
   a transaction queue that receives read requests issued by a processor core and, responsive to the read request, issues a control signal,
   a prefetch queue that receives the control signal from the cache queue and receives an address of the read request, the prefetch queue comprising:
      an incrementor that increments the received address,
      an address buffer that stores a plurality of addresses and generates a match signal when the received address matches a stored address,
      a request register that issues the prefetch request, and
      a controller, that causes the incremented address to be written over the matching address and further causes the incremented address to be read into the request register responsive to the match signal.

2. The system of claim 1, wherein the prefetch queue receives the address from the transaction queue.

3. The system of claim 1, further comprising an arbiter that outputs read requests, wherein the prefetch queue receives the address from the arbiter.

4. A prefetch queue for use with a processor, comprising:
   an address register that receives an address associated with a predetermined processor transaction,
   an incrementor that increments the received address,
   an address buffer memory that stores a plurality of addresses,
   match detection circuitry that generates a match signal when the received address matches a stored address,
   a request register that stores an address associated with a prefetch request, and
   a controller responsive to the match signal that enables the incremented address to be written over the matching stored address and enables the incremented address to be read into the request register.

5. The prefetch queue of claim 4, wherein the controller enables the incremented address to be written to an entry in the address buffer memory when no match occurs.

6. The prefetch queue of claim 4, wherein:
   the match detection circuitry generates a second match signal when the received address is a close match of a stored address,
   responsive to the second match signal, the controller enables the incremented address to be written over the closely matching stored address.

7. The prefetch queue of claim 6, wherein a close match occurs when the received address is within a predetermined number of memory locations of a stored address.

8. The prefetch queue of claim 6, wherein a close match occurs when the received address falls on a same page as a stored address.

9. A method of prefetching data in a processor, comprising steps of:
   detecting a read request issued by a processor core,
   receiving an address associated with the request,
   determining whether the received address matches stored incremented addresses of previous read requests issued by the core,
   when a match occurs, incrementing the received address, storing the incremented address over a matching address, and issuing a prefetch request to the incremented address.

10. The method of claim 9, further comprising a step of storing the incremented address.

11. The method of claim 10, wherein the incremented address is confined to a same memory page as the received address.

12. A method of prefetching data in a processor, comprising steps of:
   detecting a read request issued by a processor core,
   receiving an address associated with the request,
   determining whether the received address matches stored incremented addresses of previous read requests issued by the core,
   when a close match occurs, incrementing the received address, storing the incremented address over a closely matching address and issuing a prefetch request to the incremented address.

13. The method of claim 12, wherein a close match occurs when the received address is within a predetermined number of addresses of a stored incremented address.

14. The method of claim 12, wherein a close match occurs when the received address is within a same memory page as a stored incremented address.

* * * * *